Patented Jan. 6, 1948

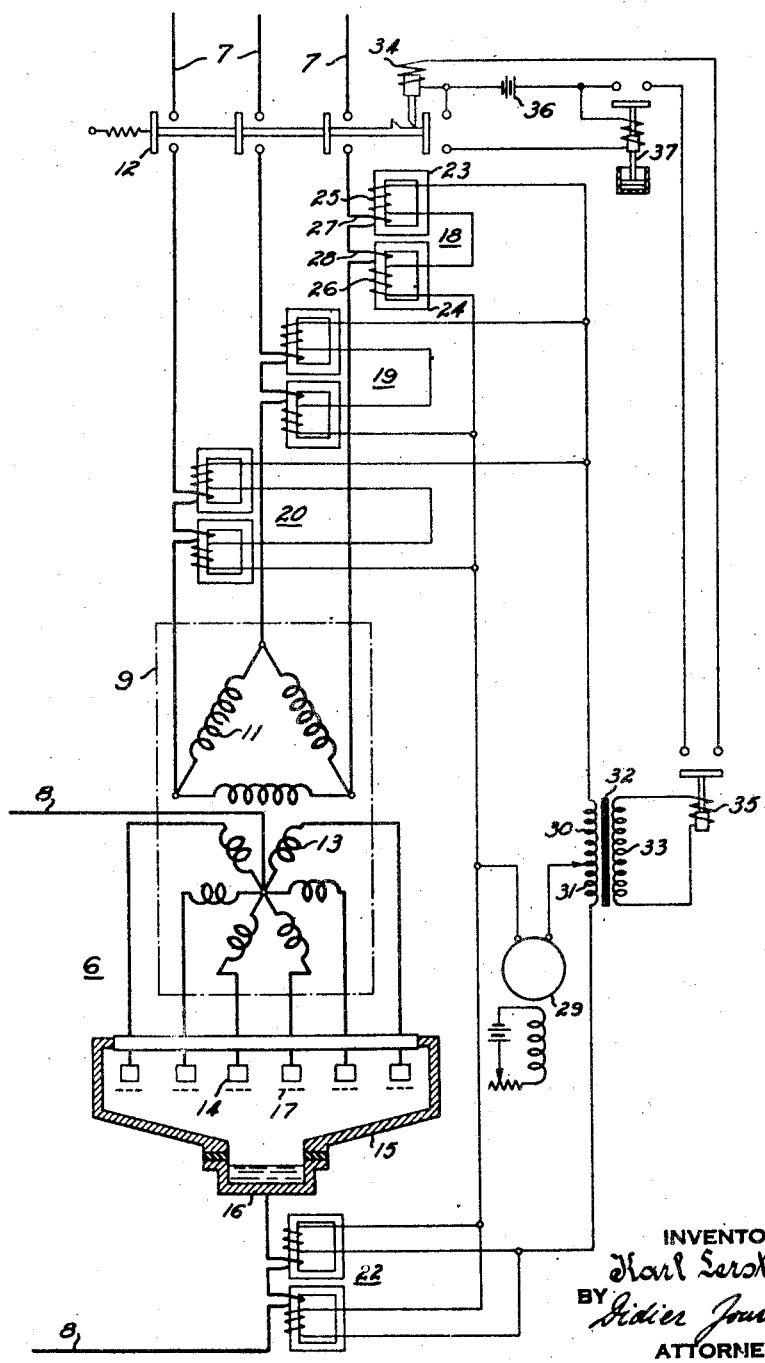

2,434,214

UNITED STATES PATENT OFFICE 2,434,214

PROTECTIVE SYSTEM FOR CURRENT CONVERTORS UTILIZING DIFFERENTIALLY CONNECTED SATURABLE REACTORS

Karl Lerstrup, Milwaukee, Wis., assignor to Allis-Chalmers Manufacturing Company, Milwaukee, Wis., a corporation of Delaware Application February 19, 1947, Serial No. 729,548

6 Claims. (Cl. 175—363)

1

This invention relates in general to electric protective systems, and more particularly to a system utilizing differentially connected saturable reactors for protecting a current converter.

Converters which are supplied with current of one form from an input circuit to supply current of another form to an output circuit, lend themselves conveniently to protection against the effects of internal disturbances by means of systems differentially responsive to their input and output currents. When either the input or the output circuit associated with the converter is a direct current circuit carrying current of relatively high intensity, the protective system is generally energized in response to the direct current through the intermediary of a shunt. Such shunts are, however, bulky and expensive and introduce undesirable conductive connections between the circuits of the protective system and the circuits of the converter. Such disadvantages are aggravated when both input and output circuits are direct current circuits.

The above mentioned disadvantages may be obviated by utilizing as current responsive elements a plurality of saturable reactors which are of relatively small size and low cost and provide the desired insulation between the converter circuits and the circuits of the protective system.

It is therefore one object of the present invention to provide an improved differential protective system for a current converter in which the circuits of the system are insulated from the circuits of the converter.

Another object of the present invention is to provide an improved differential protective system for a current converter in which the circuits of the protective system and of the converter are linked magnetically.

Objects and advantages other than those above set forth will be apparent from the following description when read in connection with the accompanying drawing, which diagrammatically illustrates one embodiment of the invention utilized for controlling a converter of the electric valve rectifying type.

Referring more particularly to the drawing by characters of reference, numeral 6 generally designates a converter of the electric valve type for the transmission of energy between two electric circuits 7, 8. Circuit 7 is assumed to be a polyphase circuit comprising a plurality of phase conductors and circuit 8 is assumed to be a direct current circuit, but the two circuits may involve all possible combinations of single phase, polyphase and direct current circuits. Converter 6

2 may comprise a transformer 9 having a polyphase primary winding connected with the different phase conductors of circuit 7 through the main contacts of a switch 12. The secondary winding 13 of transformer 9 comprises a plurality of phase portions severally connected with the anodes 14 of a plurality of electric valves 15. The different phase portions of winding 13 are interconnected to define a neutral point connected with one of the conductors of circuit 8.

Valves 15 may be provided with separate cathodes or with a common cathode 16 connected with the other conductor of circuit 8 and enclosed with anodes 14 within a common evacuated container. Control grids 17 energized at suitable potentials may be severally associated with anodes 14 to regulate the conversion of current from circuit 7 to circuit 8 or to cause the flow of energy to take place from circuit 8 to circuit 7, as is well known.

The operation of switch 12 may be controlled by means differentially responsive to the currents of circuits 7 and 8, including a plurality of saturable reactors 18, 19, 20 associated with circuit 7 and a saturable reactor 22 associated with circuit 8.

The saturable reactors may be of any suitable known type and may all be alike. The preferred reactor arrangement shown in Fig. 1 will therefore be described in detail only with respect to reactor 18.

Reactor 18 comprises a pair of closed laminated magnetic cores 23, 24 severally associated with a pair of inductive windings 25, 26 and a pair of control windings 27, 28. The control windings may comprise a variable number of turns depending upon the maximum current intensity in the conductors of the converter circuits. When the currents of the converter circuits are large, each control winding may consist of a straight section of bus bar penetrating through the window of the associated reactor core.

Windings 25, 27, and likewise windings 26, 28, are disposed in such close proximity to each other as to reduce magnetic leakage therebetween to the greatest extent consistent with the provision of adequate insulation therebetween.

Windings 27, 28 are serially connected and may be inserted in one of the phase conductors of circuit 7 either conductively or through the intermediary of current transformers. Windings 25, 26 are also serially connected and are so wound on the associated cores that when a periodic magnetizing current is supplied to windings 25, 26 the voltages induced thereby in windings 27, 28 are equal and oppose each other in circuit 7. Likewise, when alternating current flows through circuit 7 the voltages induced thereby in windings 25, 26 are equal and opposite so that they do not appear in the circuits connected with windings 25, 26.

Reactors 19, 20 are connected similarly to reactor 18 with their control windings inserted in the other conductors of circuit 7. Reactor 22 is also connected similarly to reactor 18 but the two inductive windings of reactor 22 may indifferently be connected in series or in parallel.

The inductive windings of reactors 18, 19, 20 are connected in parallel in a circuit to be supplied with periodic magnetizing current from a common source of alternating current represented as a generator 29. The generator operates at a frequency which is relatively high in comparison to the frequency of the voltage of circuit 7. The voltage of generator 29 is adjusted at a sufficiently high value to cause cores 23, 24 to reach magnetic saturation during a substantial portion of each voltage cycle. The connections between the inductive windings of reactors 18, 19, 20 and generator 29 include an adjustable portion 30 of the primary winding of a transformer 32. The inductive windings of reactor 22 are also joined to generator 29 through connections including another primary winding portion 31 of transformer 32.

Transformer 32 is provided with a secondary winding 33 for controlling the operation of switch 12. Winding 33 may be connected with the trip coil 34 of switch 12 through any suitable known means for rendering switch 12 unresponsive to the flow of inrush magnetizing current through winding 11. For example, winding 33 may serve to energize a relay 35 which in turn controls the connection between trip coil 34 and a suitable source of current represented as a battery 36. The contacts of relay 35 are connected in series with the contacts of a time delay relay 37, and the coil of relay 37 is connected with battery 36 through auxiliary contacts of switch 12.

During normal operation of converter 6 for transmitting variable amounts of energy in either direction between circuits 7 and 8, the coil of relay 37 is continuously energized through the auxiliary contacts of switch 12, and relay 37 maintains its contacts closed. The currents of the different phase conductors of circuit 7 are balanced and the sum of the average values of such currents is substantially proportional at every instant to the instantaneous value of the current in circuit 8. Each reactor is so designed that the average value of the magnetizing current flowing through the inductive windings thereof varies substantially in proportion to the average value of the current flowing through the associated control windings.

The average value of the total current of the inductive windings of reactors 18, 19, 20 therefore varies substantially proportionally to the average values of the currents of circuit 7 and of circuit 8 as if the control windings were supplied with direct current from circuit 8. There is accordingly a constant ratio between the average values of the currents supplied by generator 29, through windings 30 and 31, to the inductive windings of reactors 18, 19, 20 and to the inductive windings of reactor 22. Such currents have a differential action on winding 33, and winding 33 may be rendered unresponsive to the joint action of such currents by proper adjustment of the common terminal of windings 30, 31.

Upon occurrence of a disturbance within converter 6, such as loss of valve action in one of valves 15 or a short circuit in a winding of transformer 9, the ratio between the currents of windings 30, 31 departs from its normal value and a voltage is induced thereby in winding 33. Current is supplied by winding 33 to the coil of relay 35, which instantaneously connects trip coil 34 with battery 36 to cause opening of switch 12. Relay 35 returns to the position shown upon interruption of the flow of current through converter 6 by opening of switch 12, and relay 37 likewise returns to the position shown.

When switch 12 is reclosed, the coil of relay 37 is re-energized. Winding 11 momentarily draws from circuit 7 an inrush magnetizing current component which has no counterpart in the current of circuit 8. A voltage may therefore be momentarily induced in winding 33 even though no disturbance has taken place in the operation of converter 6. Relay 37 however, may be so adjusted that the time required to close the contacts thereof is longer than the duration of the inrush current. The operation of switch 12 is thus rendered unresponsive to the differential action of the currents of windings 30, 31 resulting from the flow of inrush current.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. In a protective system for a current converter connecting an input circuit with an output circuit, the combination of first reactor means comprising a first inductive winding and a first control winding, means for energizing said first control winding in dependence upon the current intensity through said input circuit, second reactor means comprising a second inductive winding and a second control winding, means for energizing said second control winding in dependence upon the current intensity through said output circuit, a source of alternating current, means for connecting said first and second inductive windings with said source, and means for controlling the operation of said converter comprising means differentially responsive to the currents of said first and second inductive windings.

2. In a protective system for a current converter connecting a polyphase alternating current circuit comprising a plurality of phase conductors with a second electric circuit, the combination of first reactor means comprising a plurality of inductive windings and of control windings, means for energizing the different said control windings in dependence upon the current intensities through the different said phase conductors, second reactor means comprising an inductive winding and a control winding, means for energizing the second said control winding in dependence upon the current intensity through said second circuit, a source of alternating current, first connecting means joining said source with the first said inductive windings, second connecting means joining said source with the second said inductive winding, and means for controlling the operation of said converter comprising means differentially responsive to the currents of said first and second connecting means.

3. In a protective system for a current converter connecting a polyphase alternating current circuit comprising a plurality of phase conductors with a second electric circuit, the combination of first reactor means comprising a plurality of inductive windings and of control windings, means for energizing the different said control windings in dependence upon the current intensities through the different said phase conductors, second reactor means comprising an inductive winding and a control winding, means for energizing the second said control winding in dependence upon the current intensity through said second circuit, a source of alternating current, first connecting means joining said source with the first said inductive windings, the first said inductive windings being connected in parallel, second connecting means joining said source with the second said inductive winding, and means for controlling the operation of said converter comprising means differentially responsive to the currents of said first and second connecting means.

4. In a protective system for a current converter connecting an input circuit with an output circuit, one of said circuits carrying alternating current of a predetermined frequency, the combination of first reactor means comprising a first inductive winding and a first control winding, means for energizing said first control winding in dependence upon the current intensity through said input circuit, second reactor means comprising a second inductive winding and a second control winding, means for energizing said second control winding in dependence upon the current intensity through said output circuit, a source of alternating current of a frequency higher than said predetermined frequency, means for connecting said first and second inductive windings with said source, and means for controlling the operation of said converter comprising means differentially responsive to the currents of said first and second inductive windings.

5. In a protective system for a current converter connecting an input circuit with an output circuit, one of said circuits being an alternating current circuit and the other said circuit being a direct current circuit, the combination of first reactor means comprising a first inductive winding and a first control winding, means for energizing said first control winding in dependence upon the current intensity through said input circuit, second reactor means comprising a second inductive winding and a second control winding, means for energizing said second control winding in dependence upon the current intensity through said output circuit, a source of alternating current, means for connecting said first and second inductive windings with said source, and means for controlling the operation of said converter comprising means differentially responsive to the currents of said first and second inductive windings.

6. In a protective system for a current converter connecting an input circuit with an output circuit, said converter comprising a transformer drawing a variable inrush current upon energization thereof, the combination of first reactor means comprising a first inductive winding and a first control winding, means for energizing said first control winding in dependence upon the current intensity through said input circuit, second reactor means comprising a second inductive winding and a second control winding, means for energizing said second control winding in dependence upon the current intensity through said output circuit, a source of alternating current, means for connecting said first and second inductive windings with said source, means for controlling the operation of said converter comprising means differentially responsive to the currents of said first and second inductive windings, and means for rendering said converter controlling means unresponsive to differential actions of the currents of said first and second inductive windings resulting from the flow of said inrush current through said transformer.

KARL LERSTRUP.